United States Patent
Waller et al.

(10) Patent No.: US 11,163,946 B2
(45) Date of Patent: Nov. 2, 2021

(54) METHOD AND SYSTEM FOR DISPLAYING CONTENT FOR ACCESSIBILITY

(71) Applicant: Anaplan, Inc., San Francisco, CA (US)

(72) Inventors: David Martin Waller, Shelby (GB); David Craig McGinn, Harrogate (GB)

(73) Assignee: Anaplan, Inc., San Francisco, CA (US)

( * ) Notice: Subject to any disclaimer, the term of this patent is extended or adjusted under 35 U.S.C. 154(b) by 9 days.

(21) Appl. No.: 16/454,007

(22) Filed: Jun. 26, 2019

(65) Prior Publication Data

US 2020/0410048 A1    Dec. 31, 2020

(51) Int. Cl.

| G06F 17/00 | (2019.01) |
|---|---|
| G06F 40/18 | (2020.01) |
| G06T 11/00 | (2006.01) |
| G06F 40/174 | (2020.01) |
| G06F 40/177 | (2020.01) |

(52) U.S. Cl.
CPC ............ *G06F 40/18* (2020.01); *G06F 40/174* (2020.01); *G06F 40/177* (2020.01); *G06T 11/001* (2013.01)

(58) Field of Classification Search
CPC ...... G06F 40/18; G06F 40/177; G06F 40/174; G06T 11/001
USPC ................................ 715/217, 200, 215, 212
See application file for complete search history.

(56) References Cited

U.S. PATENT DOCUMENTS

| 6,256,649 B1 * | 7/2001 | Mackinlay | G06F 40/18 715/212 |
| 7,627,812 B2 * | 12/2009 | Chamberlain | G06F 40/103 715/217 |
| 10,169,317 B2 * | 1/2019 | Williamson | G06F 40/106 |
| 2005/0273695 A1 * | 12/2005 | Schnurr | H04W 24/00 715/213 |
| 2007/0050700 A1 * | 3/2007 | Simkhay | G06F 40/18 715/220 |

OTHER PUBLICATIONS

Caldwell, et al., "Web Content Accessibility Guidelines (WCAG) 2.0", Dec. 11, 2008 (29 pages).

* cited by examiner

*Primary Examiner* — Manglesh M Patel
(74) *Attorney, Agent, or Firm* — Chamberlain, Hrdlicka, White, Williams & Aughtry

(57) ABSTRACT

In general, embodiments of the invention relates to methods and systems generating accessible user interfaces or graphical user interfaces. More specifically, embodiments of the invention are directed to user interfaces that display data using combinations of graphical and non-graphical cells. The graphical cells may include both a graphical component as well as a data value component, where these components do not overlap within the cell. In this manner, embodiments of the invention may provide an additional layer of accessibility and interpretability of the data values in the graphical cells.

15 Claims, 10 Drawing Sheets

FIG. 7

METHOD AND SYSTEM FOR DISPLAYING CONTENT FOR ACCESSIBILITY

BACKGROUND

It is common for users to analyze data using computer-based analysis tools. The results of the analysis are typically displayed in a table format as a set of values. Further, in an attempt to aid the user in understanding the results, values (or areas surrounding the values) may be colored, where different colors may signify different characteristics of the value. For example, a value that is colored green may be understood as a valid value; while a value that is colored red may be understood as an invalid value. While the color coding of the values may be helpful in understanding the results, for individuals with visual impairments (e.g., color blindness) the color-coding typically does not aid them in understanding the results. Further, if the color schemes used to color the results includes varying shades of the same (or similar) colors, which is often the case, then individuals with and without visual impairments will experience difficulty in differentiating the different colors associated with the different values. The net result of these traditional coloring approaches makes traditional color-coding schemes inaccessible (at varying levels) to individuals with (and without) visual impairments.

SUMMARY

In general, in one aspect, embodiments of the invention relate to a method for processing data. The method includes receiving a request to display a plurality of graphical cells, and in response to the request: obtaining a maximum graphical dimension based of the data set, generating, for the data set, a plurality of graphical cells using the maximum graphical dimension, wherein a graphical cell of the plurality of cells comprises a graphical component and a data value component, wherein the graphical component content is based on the data value component and wherein the data value is one of the plurality of values from the data set, and initiating the display of the plurality of graphical cells.

In general, in one aspect, embodiments of the invention relate to a non-transitory computer readable medium comprising computer readable program code, which when executed by a computer processor enables the computer processor to perform a method for processing data, the method comprising: receiving a request to display a plurality of graphical cells and in response to the request: obtaining a maximum graphical dimension based of the data set, generating, for the data set, a plurality of graphical cells using the maximum graphical dimension, wherein a graphical cell of the plurality of cells comprises a graphical component and a data value component, wherein the graphical component content is based on the data value component and wherein the data value is one of the plurality of values from the data set and an initiating the display of the plurality of graphical cells.

Other aspects of the invention will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 7 shows an exemplary graphical user interface in accordance with one or more embodiments of the invention.

DETAILED DESCRIPTION

Figure 1:
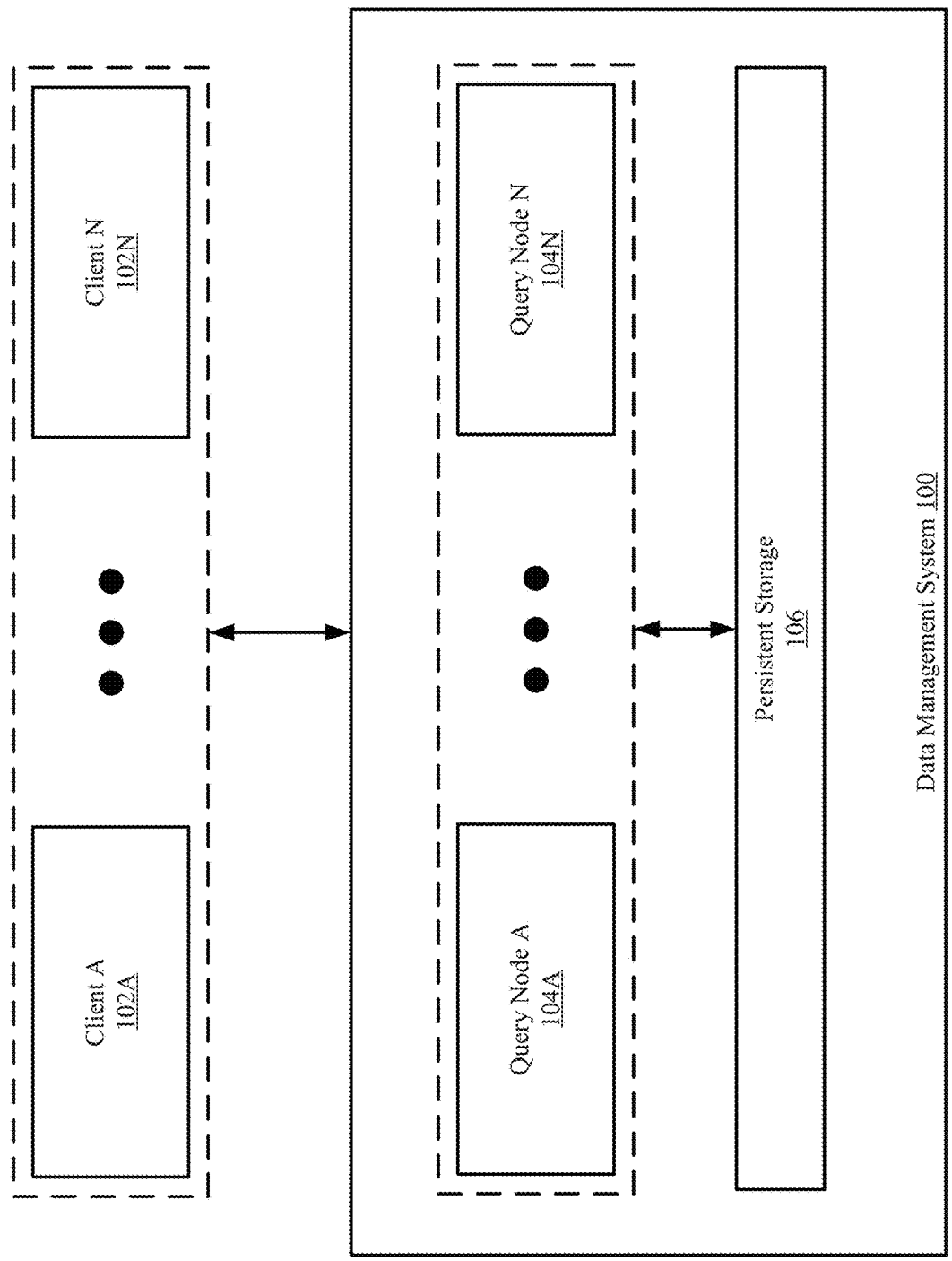
FIG. 1 shows system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relates to methods and systems generating accessible user interfaces or graphical user interfaces. More specifically, embodiments of the invention are directed to user interfaces that display data using combinations of graphical and non-graphical cells. The graphical cells include both a graphical component as well as a data value component, where these components do not overlap within the cell. In this manner, embodiments of the invention provide an additional layer of accessibility and interpretability of the data values in the graphical cells. Said another way, in addition to enabling graphical cells to use color to convey information, the graphical cells also convey the same (or substantially the same) information using the graphical component within the graphical cell. This will allow users of the graphical user interface, with and without visual impairments, to see the additional information conveyed by the graphical component.

One or more embodiments of the invention improve graphical user interface technology by providing a color-scheme agnostic approach to conditional format that uses images (shapes generated within graphical cells) within cells of a table. The color-scheme agnostic approach of various embodiments of the invention may be used in conjunction with traditional conditional formatting approaches. In this manner, visually impaired users as well as non-visual impaired used may be able to interact with the same user interface and obtain the same information by using color and non-color based conditional formatting that is concurrently present in the user interface.

FIG. 1 shows system in accordance with one or more embodiments of the invention. The system includes a Data Management System (100) interacting with one or more clients (102A, 102N). While for the sake of brevity the system of FIG. 1 has been illustrated as including a limited number of components, embodiments may include additional components than those shown in FIG. 1 without departing from the invention. Each component of the system of FIG. 1 is described below.

Continuing with the discussion of FIG. 1, the components illustrated in FIG. 1 may be connected via any number of operable connections supported by any combination of wired and/or wireless networks. Each component of the system of FIG. 1 (including the individual components in the Data Management System) may be operably connected via any combination of wired and/or wireless connections. Each component of the system of FIG. 1 is discussed below.

In one embodiment of the invention, clients (102A, 120N) are configured to issue requests to the Data Management System (or to a specific node in the Data Management System) and to receive responses. The requests may include, but are not limited to: (i) requests to obtain specific data and (ii) requests to update the manner in which data is displayed (e.g., via a graphical user interface) on the client.

In on embodiment of the invention, the clients use a web browser, to send requests and to receive responses. A web browser may correspond to any application that is executing on the client that includes functionality to access remote data (e.g., images, text, audio files, videos, etc.) and to display the remote data within a user interface (typically a graphical user interface) on the client. The client, via the web browser, may request the data using a universal resource locator (URL) associated with the data. The web browser may subsequently receive and display the content.

Depending on the embodiment, the data may either be: (i) processed locally on the client (e.g., by the web browser, a plugin in the web browser, a script executing on the web browser, another application executing on the client, etc.) and then subsequently displayed in the user interface of the client (e.g., in a user interface of a web browser, in a user interface of a client) or (ii) processed on a node (e.g., FIG. 1, 104A) with the processed content being provided to the client for display. In the former scenario, the method shown in FIG. 4 may be performed entirely on the client device after the client device receives the data set to be processed. In the latter scenario, a node (e.g., FIG. 1, 104A) may perform the method shown in FIG. 4 and then provide information necessary to display the processed content on the client.

Continuing with the discussion of FIG. 1, in one or more embodiments of the invention, zero, one or more clients (102A, 102N) are implemented as computing devices. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform none, a portion of, or all of the method shown in FIG. 4 as well as to issue one or more requests and to receive one or more responses as described throughout this application. For additional details regarding computing devices, refer to FIG. 10.

In one or more embodiments of the invention, the zero, one or more clients (102A, 102N) are implemented as logical devices. Each of the logical devices may utilize the computing resources of any number of computing devices and thereby provide the functionality to perform none, a portion of, or all of the method shown in FIG. 4 as well as to issue one or more requests and to receive one or more responses as described throughout this application. For additional details regarding computing devices, refer to FIG. 10. Examples of logical devices may include, but are not limited to, virtual machines and containers.

In one or more embodiments of the invention, the Data Management System (100) includes one or more nodes (104A, 104N), and persistent storage (106). Each of these components is described below.

In one or more embodiments of the invention, each node (104A, 104N) may be configured to service requests from the clients and then provide the client with a result. Depending on the embodiment, the result may include processing the result by performing none, a portion of, or all of the method shown in FIG. 4. For example, in one embodiment of the invention, servicing the requests by the nodes may include obtaining data from the persistent storage (106) or from other nodes (104A, 104N) and then performing analysis on (e.g., applying mathematical formulas to) the obtained data. The resulting of the analysis may be referred to a result. The result may include the data values (collectively referred to as "a data set") that are generated from the analysis along with corresponding metadata that describe the values. For example, the data values may be values between 10%-85% and the metadata may indicate that these values correspond to bonuses. The result may then be processed in accordance with FIG. 4 to generate one or more graphical cells, which are then ultimately displayed on one or more clients. From the perspective of the client, the result is a set of processed data that is used to render zero, one or more graphical cells and zero, one, or more non-graphical cells. In this embodiment, the result includes data values along with information about how to display the data values on the client.

In another embodiment of the invention, the result only includes the data set. Once the data set is received by the client (e.g., as part of the response). The processing of the data set for display on the client is performed locally on the client. The result of the processing on the client is the display of the data set as a series of zero, one or more graphical cells and zero, one, or more non-graphical cells.

In one or more embodiments of the invention, zero, one or more nodes (104A, 104N) are implemented as computing devices. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to service requests from the clients and the provide the client with a result. Depending on the embodiment, the result may include processing the result by performing none, a portion of, or all of the method shown in FIG. 4. For additional details regarding computing devices, refer to FIG. 10.

In one or more embodiments of the invention, the zero, one or more nodes (104A, 104N) are implemented as logical devices. Each of the logical devices may utilize the computing resources of any number of computing devices and thereby provide the functionality to service requests from the clients and the provide the client with a result. Depending on the embodiment, the result may include processing the result by performing none, a portion of, or all of the method shown in FIG. 4. Examples of logical devices may include, but are not limited to, virtual machines and containers.

In one embodiment of the invention, the persistent storage (110) includes any form of non-volatile storage media that may store data (e.g., primary data and derived data). Examples of persistent storage may include, but are not limited to, magnetic storage, optical storage, solid state memory, or any combination thereof. In one embodiment of the invention, the data stored in persistent storage may be primary data and derived data. Depending on the implementation of the invention, the persistent storage may store the primary data and not store the derived data.

In one embodiment of the invention, data is denoted as primary data when the data is input by the user, obtained from a user, and/or obtained from a data source specified by the user. Further, in one embodiment of the invention, the data is denoted as derived data if the data is generated (e.g., by applying a function or an algorithm) to user data, other derived data, or any combination thereof.

Each piece of data stored in the persistent storage may be associated with metadata that provides information about the data such as the type of data and, in certain embodiments, what the data represents (e.g., bonuses, number of products sold, etc.). The metadata displayed concurrently with the corresponding data (see e.g., FIGS. 5-9).

Figure 2:
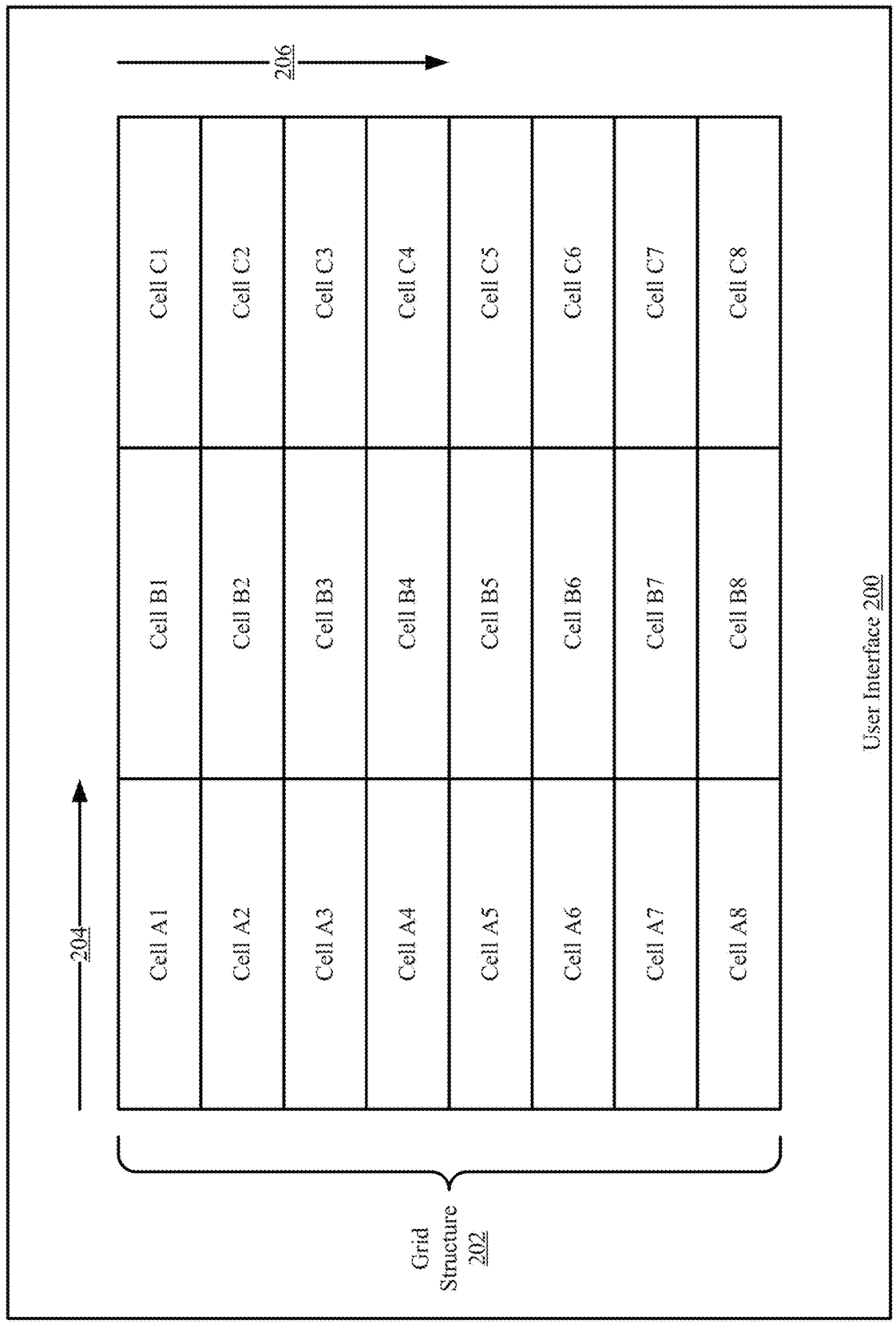
FIG. 2 shows a user interface in accordance with one or more embodiments of the invention.
Figure 3:
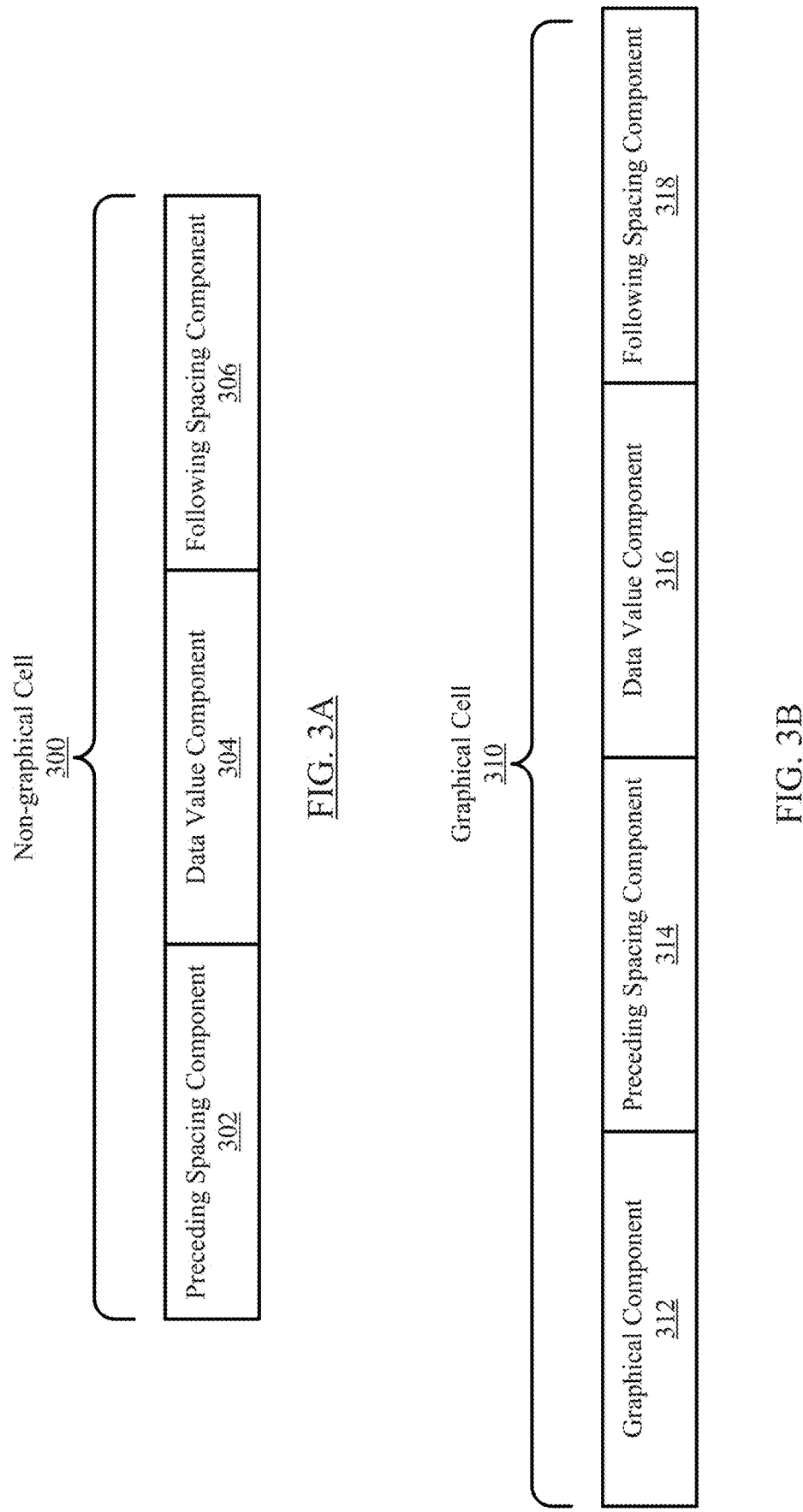
FIG. 3A shows a non-graphical cell in accordance with one or more embodiments of the invention.
FIG. 3B shows a graphical cell in accordance with one or more embodiments of the invention.

As discussed above, data (which may be primary data or user data) may be processed and the result of the processing may be displayed to a user via graphical user interface. FIGS. 2-3B show a user interface along with various components located thereon in accordance with one or more embodiments of the invention. In one embodiment of the invention, the graphical user interface may be provided by a web browser. Said another way, a web browser may include a graphical user interface through which the user may interact with the web browser and/or content displayed in the graphical user interface provided by the web browser. In another embodiment of the invention, the graphical user interface may be part of an application (other than a web browser) executing on the client.

Turning to FIG. 2, in one embodiment of the invention, the user interface (200) may include data displayed using a grid structure (202). The grid structure (202) includes a number of cells (e.g., Cell A1-Cell A8, Cell B1-Cell B8, Cell C1-Cell C8), where each of the cells may be either a non-graphical cells (see e.g., FIG. 3A) or graphical cells (see e.g., FIG. 3B). In one embodiment of the invention, the grid structure (202) may be referred to as a table (or a table format). Each of the cells in the grid structure (202) may be grouped into a row (e.g., along a row dimension (204)) and into a column (e.g., along a column dimension (206)). Through not shown in FIG. 2, each row and/or column may be associated with a descriptive label (which may be generated using the aforementioned metadata) that describes the content of the row and/or column. See e.g., FIGS. 5-9.

While for the sake of brevity the user interface of FIG. 2 has been illustrated as including a limited number of components, embodiments may include additional components than those shown in FIG. 2 without departing from the invention. For example, the user interface may include other components, such as the components shown in the examples in FIGS. 5-9 below.

Turning to FIG. 3A, FIG. 3A shows a non-graphical cell in accordance with one or more embodiments of the invention. In one embodiment of the invention, a non-graphical cell (300) includes a preceding spacing component (302), a data value component (304), and a following spacing component (306). The preceding spacing component (302) is the amount of space between a left side of a cell and the data value component (304). The data value component (304) includes the value that is displayed or to be displayed in the cell, where the value may be a numeric value, an alpha value (e.g., letters), or an alphanumeric value. The following spacing component (306) is the amount of space between a right side of a cell and the data value component (304).

FIG. 3B shows a graphical cell in accordance with one or more embodiments of the invention. In one embodiment of the invention, a non-graphical cell (310) includes a graphical component (312), a preceding spacing component (314), a data value component (316), and a following spacing component (318). The graphical component (312) includes an image that is associated with (or corresponds to) the data value component (316). The image may be a graphical representation of the value in the data value component. The specific image may vary based on the implementation. For example, the image may span the entire height of the graphical cell (see e.g., FIG. 5) or the image may occupy on a portion of the height of the graphical cell (see e.g., FIG. 6). Regardless of the specific dimensions of the image in the graphical component of a given cell, the images of the adjacent graphical cells may be viewed together as a graph, which spans multiple graphical cells (see e.g., FIGS. 5-6).

In one embodiment of the invention, the graphical component may be associated with a single color (see e.g., FIG. 6) or multiple colors. In embodiments in which the graphical components are associated with multiple colors, the colors may be represented in a series of individual bands (see e.g., FIG. 6) or using a color gradient (see e.g., FIG. 5). Other coloring schemes may be used without departing from the invention.

Continuing with the discussion of FIG. 3B, the preceding spacing component (314) is the amount of space between graphical component (312) and the data value component (316). The data value component (316) includes the value that is displayed or to be displayed in the cell, where the value may be a numeric value, an alpha value (e.g., letters), or an alphanumeric value. The value in the data value component may be an editable or non-editable value. Values that are editable may be represented with a different text color than values that are non-editable. The following spacing component (318) is the amount of space between a right side of a cell and the data value component (316).

In one embodiment of the invention, the order of the components in the graphical cell may be different than the order shown in FIG. 3B. For example, the graphical cell may be arrange as follows: <preceding space component, data value component, following space component, graphical component>.

Figure 4:
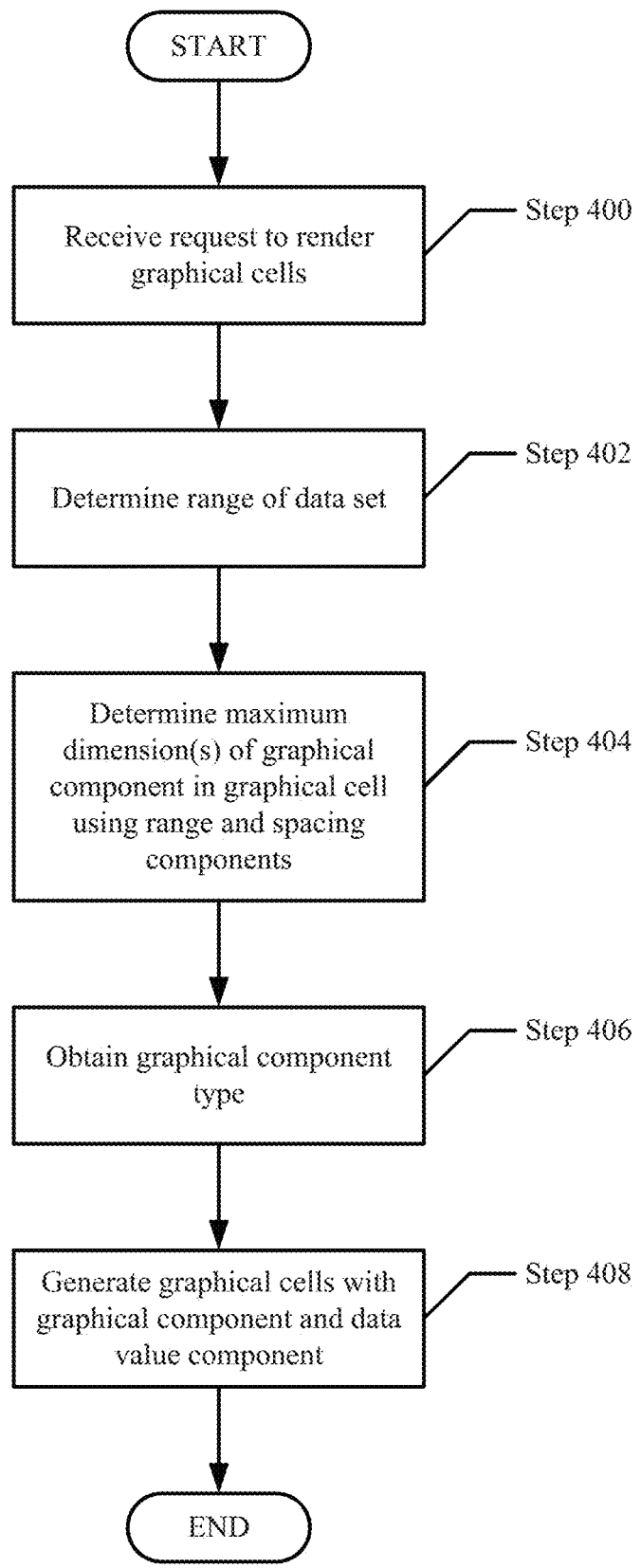
FIG. 4 shows a method for generating graphical cells in accordance with one or more embodiments of the invention.

FIG. 4 shows a method for generating graphical cells in accordance with one or more embodiments of the invention. The method shown in FIG. 4 may be performed by a client or by a node. While the various steps in the flowchart are presented and described sequentially, one of ordinary skill will appreciate that some or all steps may be executed in different orders, may be combined or omitted, and some or all steps may be executed in parallel.

In step 400, a request to render graphical cells is received. In one embodiment of the invention, the request may be part of a request to conditionally format a set of cells (e.g., Cells A1-A8). The request may include information about the specific data (or data set) to be conditionally formatted and the graphical component type (i.e., what type of images to use in the graphical cells and what color scheme (if any to apply to the graphical cells)). Examples of conditional formatting in accordance with one or more embodiments of the invention are shown in FIGS. 5-9.

The request may be initiated on a client via a user interacting with a web browser or via another application executing on the client. The request may trigger a subsequent request being sent from the client to a node to perform the remainder of the steps in FIG. 4. Alternatively, the request may trigger a subsequent request being sent from the client to the node to obtain the data (or the data set), which is then processed on the client in accordance with the remainder of the steps in FIG. 4.

The following steps may be performed in order to conditionally format the data (or data set) and generate one or more graphical cells.

In step 402, the data set is analyzed in order to determine the range of the data set. More specifically, the data set may be obtained from the persistent storage (or from cache in a node(s) if it has been previously retrieved) and analyzed to determine the minimum and maximum values of the data set. For example, if the data set is as follows <10, 50, 30, 65, 15, 90, 24>, then the range is 10-90. The example is not intended to limit the scope of the invention.

In step 404, the maximum dimensions of the graphical component for the graphical cells are determined. Specifically, as discussed above, the graphical cell includes a graphical component that is separated from the data value component by the preceding spacing component (See e.g., FIG. 3B). The preceding spacing component is sized such that there is a clear separation between the data value component and the graphical component. Said another way, the graphical component and the data value component are separated from each other such that they appear as two distinct non-overlapping components in the graphical cell. In view this constraint, the image that is included in the graphical component must be sized such that it is proportional to the value in the data value component but that its absolute size does not exceed the size of the graphical component (i.e., so the image in the graphical component does not overlap with the preceding spacing component).

To determine the maximum dimensions such that the above constraints are satisfied, the maximum possible length of the image is set to be no greater than the length of the graphical component (e.g., specified using pixels as the unit of measure) and the maximum possible length is mapped to the maximum possible value in the range determined in step 402. Further, the left boundary (or a location near the left boundary, e.g., two pixels from the left boundary) of the graphical cell is mapped to the minimum possible value in the range determined in step 402.

In step 406, the graphical component type is obtained. The graphical component type corresponds to the type of image to display in the graphical component as well as any color scheme to apply to the image. For example, the graphical component type may be "non-contiguous", which results in the generation of non-contiguous images (see e.g., FIG. 7). Another type of image may be "contiguous", which results in the generation of contiguous images (see e.g., FIG. 5). Other graphical component types may be used without departing from the invention. In one embodiment of the invention, the graphical component type, which may or may not include information related to a desired color scheme, may be obtained as part of the request in step 400.

In step 408, the graphical cells are generated, where each graphical cell includes an appropriately scaled image that is located within the graphical component of the graphical cell. The length of the image and/or the area occupied by the image in a given graphical cell is proportional to (or otherwise based on) the value in the data value component of the graphical cell. The graphical cell also includes a data value component, where the data value component and the graphical component do not overlap.

Continuing with the discussion of step 408, the graphical component may also be colored, if there is a color scheme provided in the request.

Figure 5:
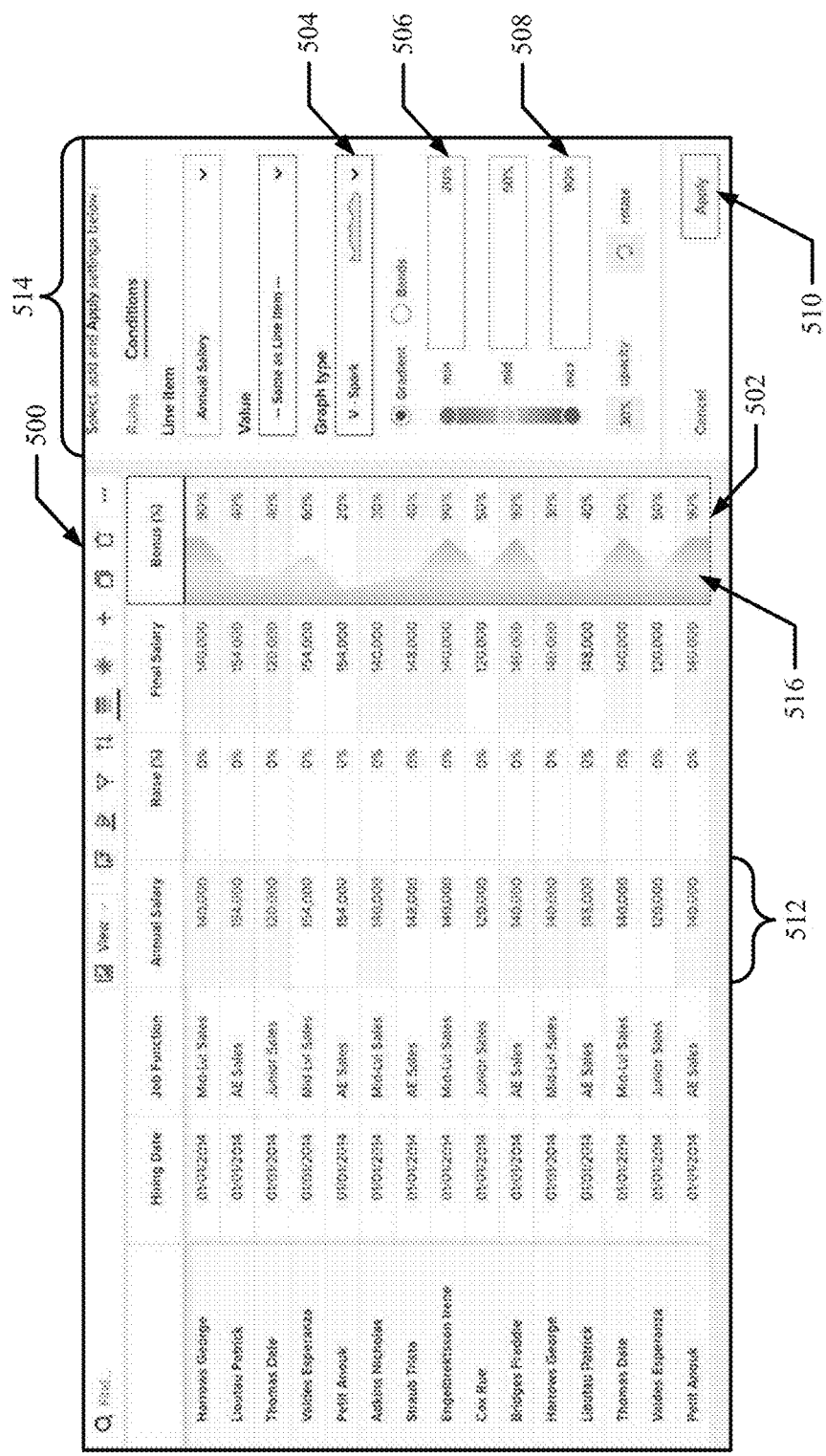
FIG. 5 shows an exemplary graphical user interface in accordance with one or more embodiments of the invention.

In one embodiment of the invention, when the graphical component type is continuous, then the area occupied by the image in the graphical component is based on the adjacent cells (e.g., the adjacent cells in the column) (see e.g., FIG. 5).

In one embodiment of the invention, if the data management system (or a node thereon) is processing the data set to generate the graphical cells, then step 408 may result in the generation of a file (or set of files) that are transmitted to the client. Upon receipt, the web browser (or application) on the client interprets the file(s) and renders the graphical cells on the user interface. The file(s) may be a hypertext mark-up language (HTML) file, Cascading Style Sheets (CCS) file, a Sass Cascading Style Sheets (SCSS) file, a Scalable Vector Graphics (SVG) files, a Portable Network Graphics (PNG) file, a JavaScript file, a JavaScript Object Notation (JSON) file, or an eXtensible Markup Language (XML) file. Other file(s) types may be used without departing from the invention.

In one embodiment of the invention, if the client is processing the data set to generate the graphical cells, then step 408 may result in the rendering of graphical cells on the user interface of the client. In this scenario, the required files for the rendering of the graphical cells (e.g., an HTML file, a CSS file, an SVG file, etc.) may be generated at runtime on the client.

In one embodiment of the invention, the graphical user interface may only display a finite number of cells within a given column. Accordingly, if the size of the data set exceeds the number of cells which can be concurrently displayed in the graphical user interface, then only a portion of the data set may be displayed at any given time. In this scenario, the information necessary to generate all of the graphical cells may be determined and stored (or otherwise cached) and, initially, a first subset of the data set is displayed using graphical cells. When the user sends a request to view additional graphical cells in a given column (e.g., by using a scroll bar in the user interface), additional graphical cells are generated (as required) and then displayed to the user interface. The display of the additional cells may be performed using the aforementioned cached data such that there may be minimal visual impact on the user experience as the user is attempting to view additional portions of the data set as graphical cells.

The following section describes exemplary user interfaces in accordance with one or more embodiments of the invention. The examples are not intended to limit the scope of the invention.

Examples

FIG. 5 shows an exemplary graphical user interface in accordance with one or more embodiments of the invention. The graphical user interface (GUI) (500) includes a set of graphical cells (502). In this example, the graphical cells are concurrently displayed with non-graphical cells (e.g., 512) in a grid structure. In this example, the GUI (500) includes a section (514) that allows the user to specify how to apply conditional formatting to the selected cells (502). More specifically, in this example, the user selected the graph type (which corresponds to the graphical component type) (504) as "V-spark", which is a contiguous graphical component type. Further, based on the selection of the cells (502), the minimum (506) and maximum (508) data values (also referred to as the range) is determined and displayed to the user. The user may trigger the generation of the graphical cells via the "Apply" button (510) on the user interface. The result is a contiguous image (516) that spans the graphical cells (502).

Figure 6:
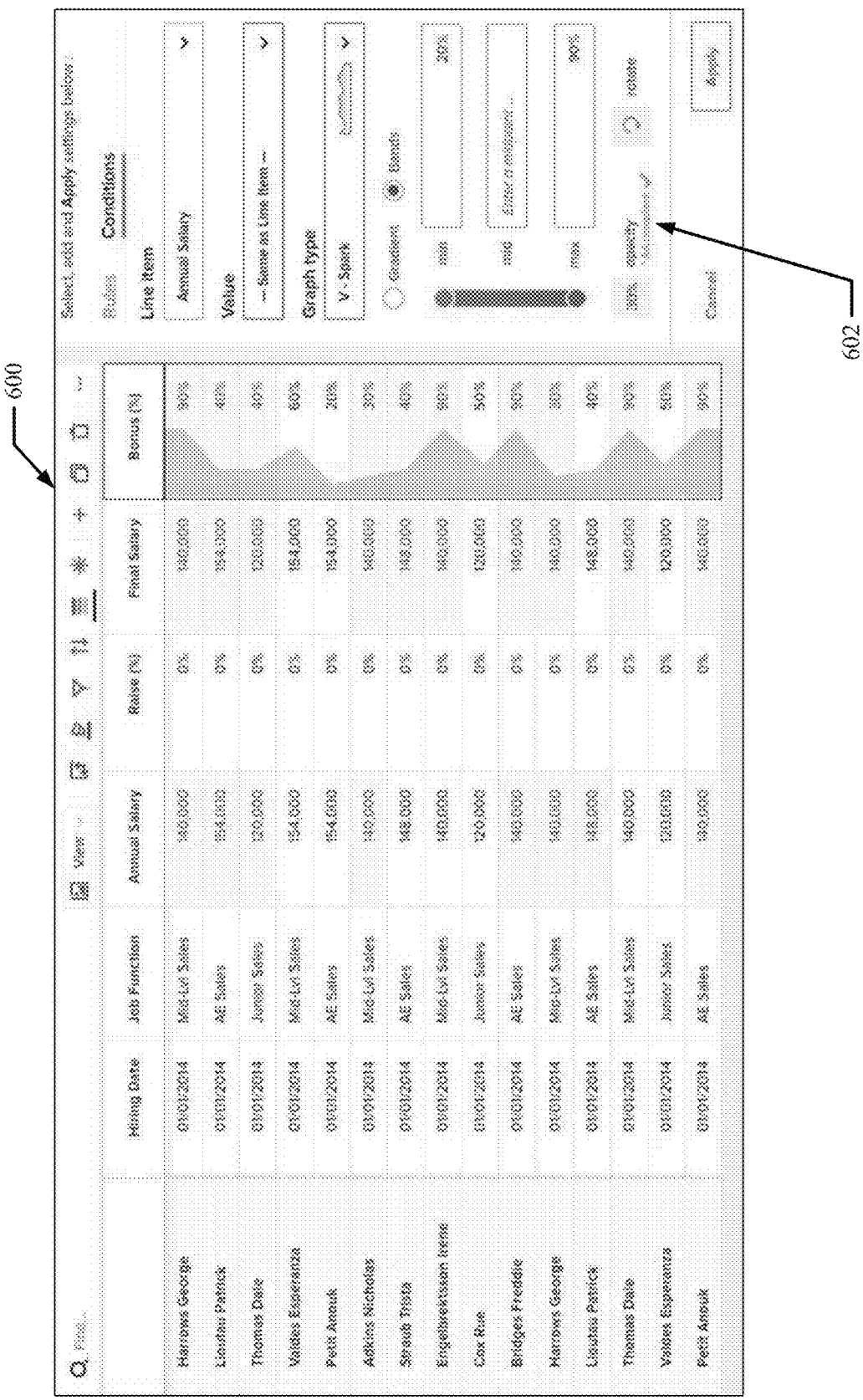
FIG. 6 shows an exemplary graphical user interface in accordance with one or more embodiments of the invention.

FIG. 6 shows an exemplary graphical user interface in accordance with one or more embodiments of the invention. The graphical user interface (GUI) (600) shown in FIG. 6, corresponds to the GUI (500) in FIG. 5. However, the user in this example has changed the color scheme used for the graphical cells and, based on the color change, the GUI (600) in FIG. 6 includes a visual indication (602) that the GUI satisfies certain accessibility standards (e.g., Web Content Accessibility Guidelines) and, in certain embodiments, the level of accessibility (e.g., A, AA, AAA).

In one embodiment of the invention, as part of step 408 (or another part of the method shown in FIG. 4), the data management system and/or the client either: (i) includes functionality to locally determine whether the graphical cells being generated (or GUI that includes the graphical cells) complies with one or more accessibility standards or (ii) provides information to an appropriate third-party service, which includes functionality to determine whether the graphical cells being generated (or GUI that includes the graphical cells) complies with one or more accessibility standards. The result of the analysis may be: (i) not compliant, (ii) compliant; or (iii) compliant with level of compliance specified. The results of the analysis may then be used to generate and display a visual indication (e.g., text and/or an image) on the graphical user interface. In one embodiment of the invention, the compliance analysis focuses on the color scheme in the images but not on the shapes of the images themselves.

Figure 7:
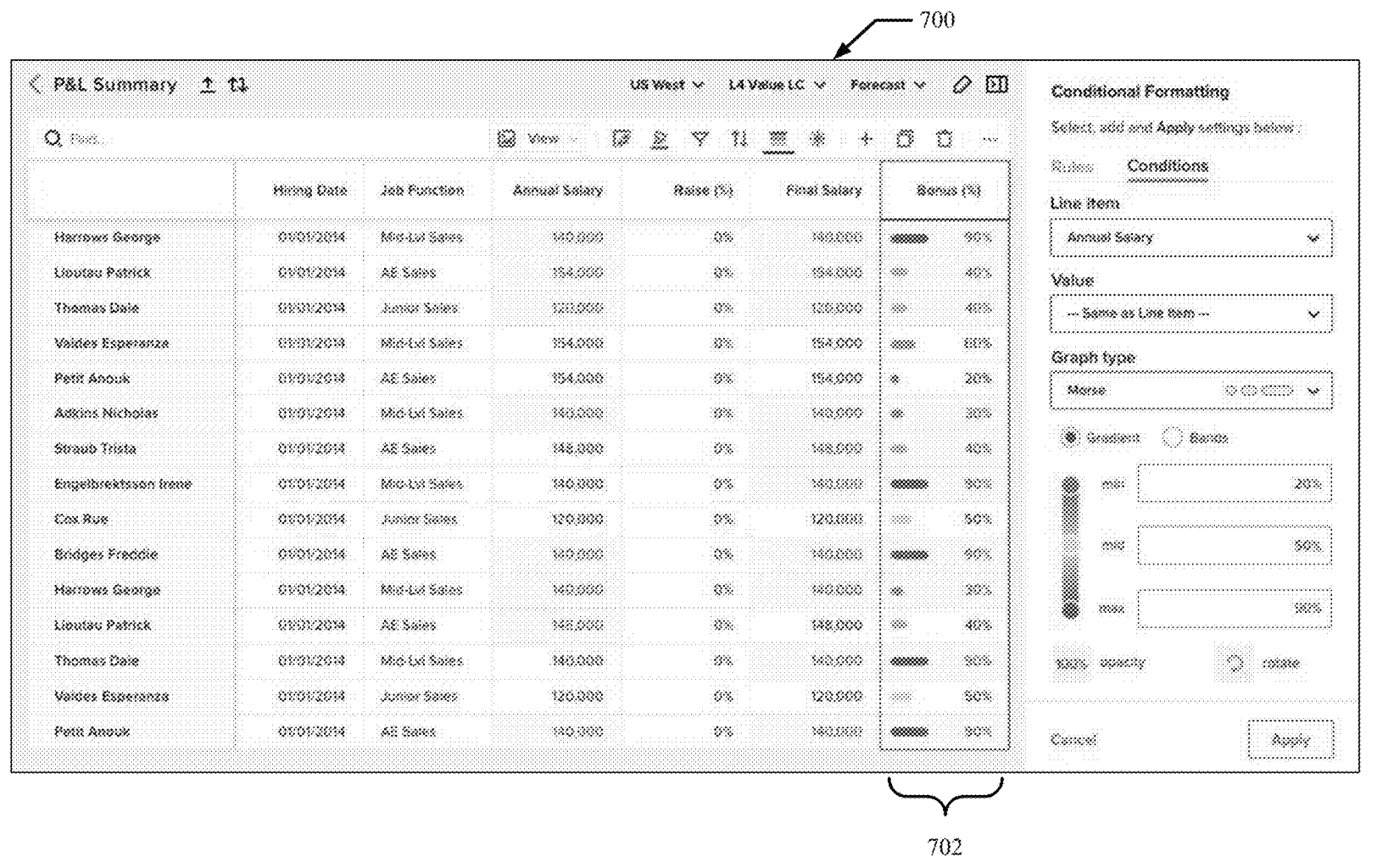

FIG. 7 shows an exemplary graphical user interface in accordance with one or more embodiments of the invention. The graphical user interface (GUI) (700) shown in FIG. 7, corresponds to the GUI (500) in FIG. 5. However, the user in this example has changed the graphical component type to non-contiguous (also referred to as "Morse" in this example). The result is a set of non-contiguous images (702).

Figure 8:
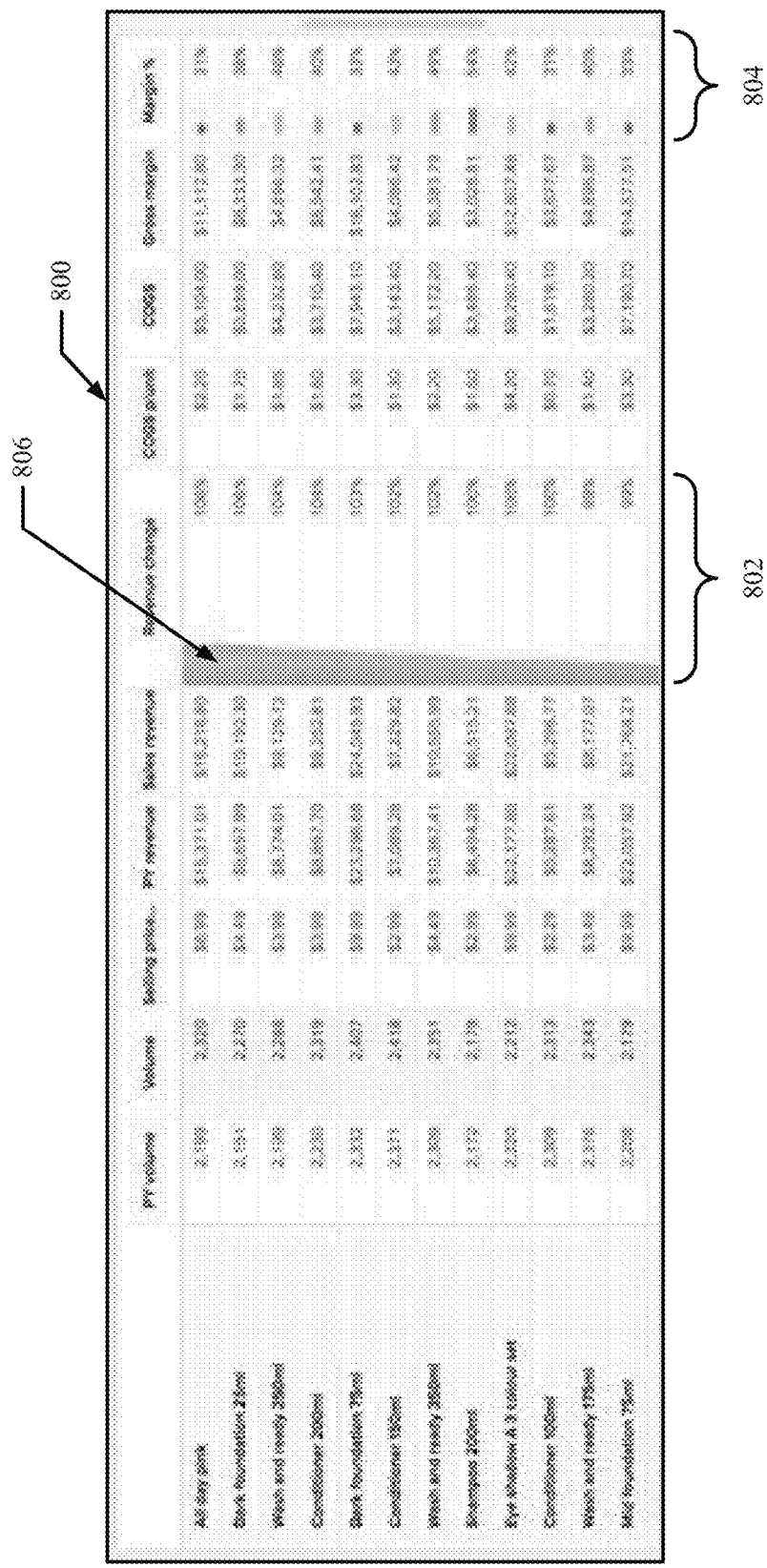
FIG. 8 shows an exemplary graphical user interface in accordance with one or more embodiments of the invention.

FIG. 8 shows an exemplary graphical user interface in accordance with one or more embodiments of the invention. This example illustrates that different graphical component types can concurrently exist in a single user interface. More specifically, in this example, the graphical user interface (GUI) (800) includes a two sets of graphical cells (802, 804). The first set of graphical cells (802) has a graphical component type of "contiguous"). Further, this first set of cells is sorted in decreasing order of data value. This trend can be readily seen from the contiguous image (806) (i.e., the contiguous set of images that are displayed as a single contiguous image) that spans these cells. In one embodiment of the invention, the re-ordering of data graphical cells in, e.g., a column may trigger the generation of new graphical cells in accordance with FIG. 4. Continuing with the discussion of FIG. 4, the second set of graphical cells (804) have a graphical component type of "non-contiguous", which results in a set of non-contiguous images being displayed in the graphical cells.

As shown in FIG. 8, by re-ordering the graphical cells based on the data value component, the user may be able to determine the presence of a trend (if one exists) based only on the graphical components of the graphical cells. Thus, users are able to perform visual trend analysis within a table, which alleviates the need to create a separate graph on a different portion or screen of the user interface. Further, the user may also be able to readily detect anomalies or outliers in the data set based only on the graphical components of the graphical cells. Said another way, by generating a visual representation of the data within the table, the user may be able to readily identify graphical component cells that have data that is outside the expected range.

Figure 9:
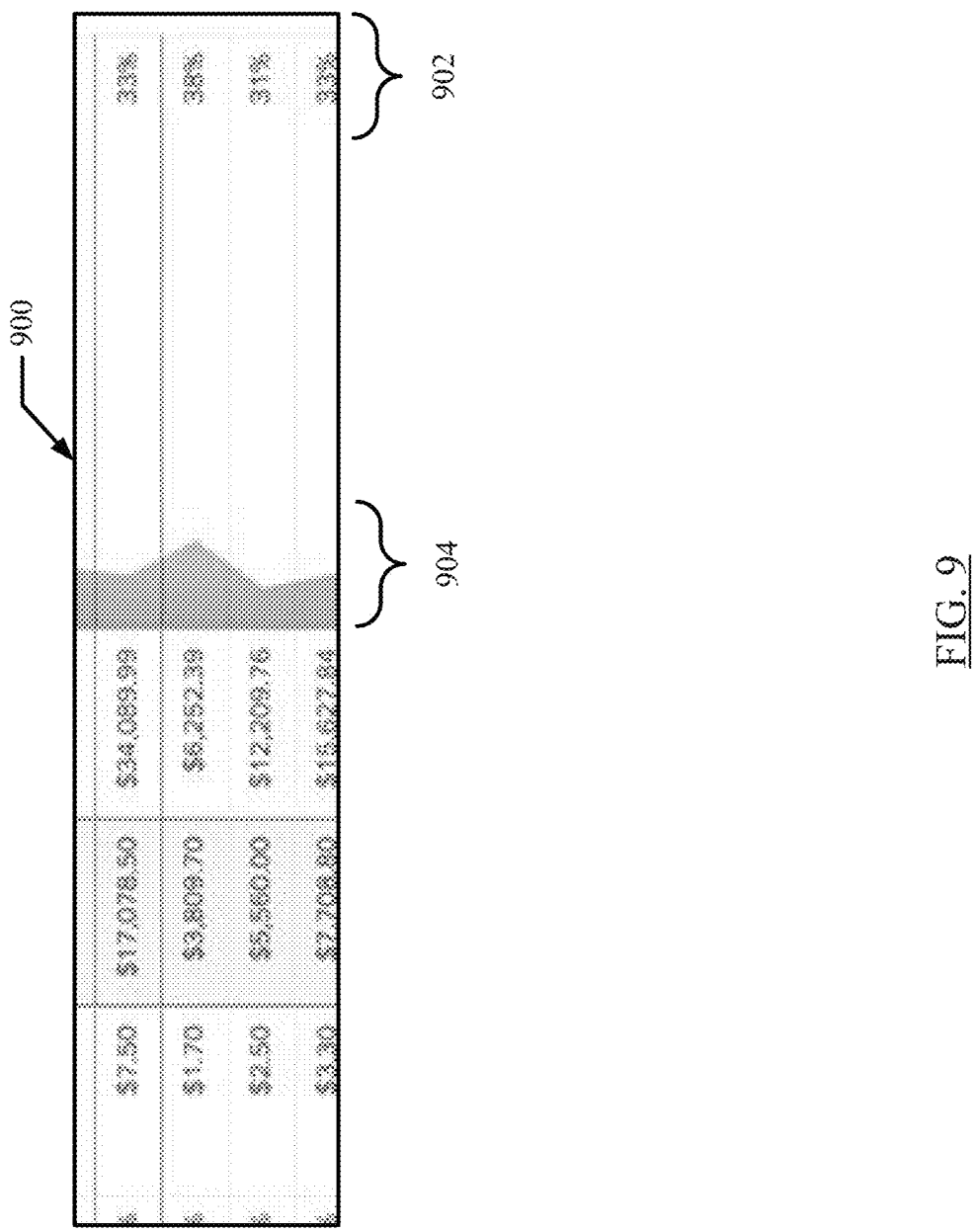
FIG. 9 shows an exemplary graphical user interface in accordance with one or more embodiments of the invention.

FIG. 9 shows an exemplary graphical user interface in accordance with one or more embodiments of the invention. The portion of graphical user interface (GUI) (900) shown in FIG. 9 illustrates the result of re-sizing the graphical cells in accordance with one or more embodiments of the invention. More specifically, when the width of the graphical cell is modified (either expanded or reduced) this triggers the generation of new graphical cells (e.g., using the method shown in FIG. 4 with the new dimensions of the graphical cell). The new graphical cells may have larger or smaller graphical components depending on how the graphical cell is modified. In cases in which the graphical cell width is increased, the graphical component portion increases without increasing the size of the data value component. This results in a larger graphical component, which can now accommodate a large image. The net effect of this is an in "cell" or "in column" zoom operation that allows better visual differentiation of images that correspond to similar data vales. In Turning back to FIG. 9, the data values (902) are relatively similar (i.e., between 31-38%); however, the corresponding images (904) show more pronounced differences. By expanding the size of the graphical components across the graphical cells in a grid structure, users are able to readily differentiate substantially similar data values.

End of Examples

Figure 10:
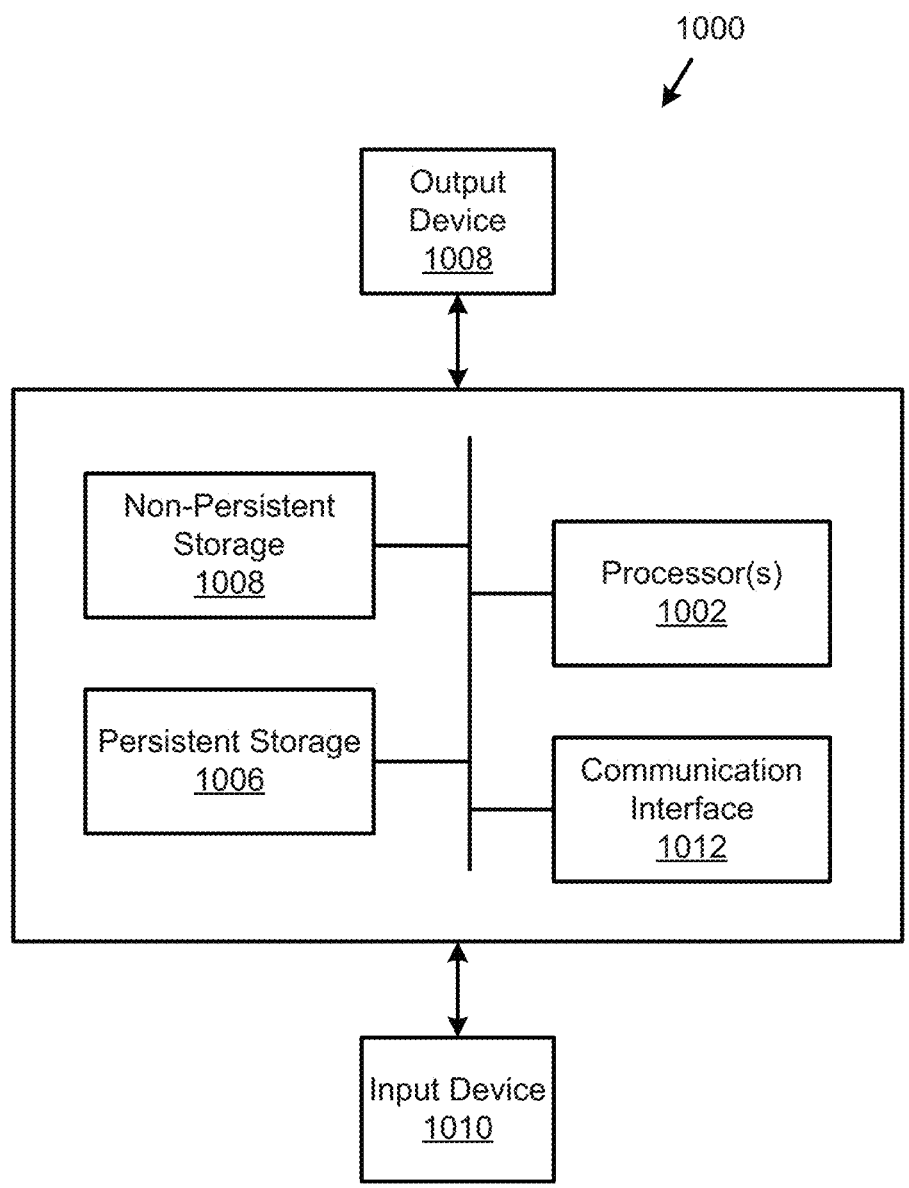
FIG. 10 shows a computing system in accordance with one or more embodiments of the invention.

FIG. 10 shows a computing system in accordance with one or more embodiments of the invention.

As discussed above, embodiments of the invention may be implemented using computing devices. FIG. 10 shows a diagram of a computing device in accordance with one or more embodiments of the invention. The computing device (1000) may include one or more computer processors (1002), non-persistent storage (1004) (e.g., volatile memory, such as random access memory (RAM), cache memory), persistent storage (1006) (e.g., a hard disk, an optical drive such as a compact disk (CD) drive or digital versatile disk (DVD) drive, a flash memory, etc.), a communication interface (1012) (e.g., Bluetooth interface, infrared interface, network interface, optical interface, etc.), input devices (1010), output devices (1008), and numerous other elements (not shown) and functionalities. Each of these components is described below.

In one embodiment of the invention, the computer processor(s) (1002) may be an integrated circuit for processing instructions. For example, the computer processor(s) may be one or more cores or micro-cores of a processor. The computing device (1000) may also include one or more input devices (1010), such as a touchscreen, keyboard, mouse, microphone, touchpad, electronic pen, or any other type of input device. Further, the communication interface (1012) may include an integrated circuit for connecting the computing device (1000) to a network (not shown) (e.g., a local area network (LAN), a wide area network (WAN) such as the Internet, mobile network, or any other type of network) and/or to another device, such as another computing device.

In one embodiment of the invention, the computing device (1000) may include one or more output devices (1008), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (1002), non-persistent storage (1004), and persistent storage (1006). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

The improvement to the graphical user interface technology by various embodiments of the invention discussed above should be understood as being examples of improvements to the technology and should not be limit the invention is any manner.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for processing data, the method comprising:
receiving a request to display a plurality of graphical cells;
in response to the request:
obtaining a maximum graphical dimension based on a data set;
generating, for the data set, a plurality of graphical cells using the maximum graphical dimension,
wherein a graphical cell of the plurality of graphical cells comprises a graphical component and a data value component,
wherein a second graphical cell of the plurality of graphical cells comprises a second graphical component content,
wherein a graphical component content of a first graphical cell includes a variable cell spacing component that forms a contiguous pattern with the second graphical component of a second graphical cell to convey a single contiguous image, and
wherein the graphical component content and the second graphical component content are part of a contiguous image that spans at least the graphical cell and the second graphical cell,
and
initiating the display of the plurality of graphical cells.

2. The method of claim 1, wherein obtaining the maximum graphical dimension for the data set comprises determining a range of the plurality of values in the data set.

3. The method of claim 1, wherein the graphical cell further comprises a preceding spacing component that is interposed between the graphical component and the data value component.

4. The method of claim 3, wherein the graphical component extends from a left side of a graphical cell to the preceding spacing component.

5. The method of claim 1, wherein generating the plurality of graphical cells comprising generating a column of graphical cells as part of a table.

6. The method of claim 5, wherein the table comprises a plurality of non-graphical cells that form a second column in the table.

7. The method of claim 1,
wherein the second graphical cell comprises a second data value component;
wherein the second graphical component content is an image portion, wherein the image portion is part of the contiguous image;
wherein a shape of the image portion is based on the data value component and a second data value component.

8. The method of claim 7, wherein generating the plurality of graphical cells further comprises using a selected color scheme.

9. The method of claim 8, further comprising:
determining that the selected color scheme satisfies an accessibility requirement;
based on the determination:
generating a visual notification that the color scheme satisfies the accessibility requirement;
initiating the display of the visual notification.

10. A non-transitory computer readable medium comprising computer readable program code, which when executed by a computer processor enables the computer processor to perform a method for processing data, the method comprising:
receiving a request to display a plurality of graphical cells;
in response to the request:
obtaining a maximum graphical dimension based on the data set;
generating, for the data set, a plurality of graphical cells using the maximum graphical dimension, wherein a graphical cell of the plurality of cells comprises a graphical component and a data value component, wherein a graphical component content is based on the data value component and wherein the data value is one of a plurality of values from the data set wherein a second graphical cell of the plurality of graphical cells comprises a second graphical component content, and wherein the graphical component content of a first graphical cell includes a variable cell spacing component that forms a contiguous pattern with the second graphical component of the second graphical cell to convey a single contiguous image, and initiating the display of the plurality of graphical cells.

11. The non-transitory computer readable medium of claim 10, wherein the graphical cell further comprises a preceding spacing component that is interposed between the graphical component and the data value component.

12. The non-transitory computer readable medium of claim 11, wherein the graphical component extends from a left side of a graphical cell to the preceding spacing component and wherein the graphical component occupies an entire height of the graphical cell.

13. The non-transitory computer readable medium of claim 10, wherein generating the plurality of graphical cells comprising generating a column of graphical cells as part of a table and wherein the table comprises a plurality of non-graphical cells that form a second column in the table.

14. The non-transitory computer readable medium of claim 10,
wherein the second graphical cell comprises a second data value component;
wherein the second graphical component content is an image portion, wherein the image portion is part of the contiguous image;
wherein a shape of the image portion is based on the data value component and a second data value component.

15. The non-transitory computer readable medium of claim 10,
wherein generating the plurality of graphical cells further comprises using a selected color scheme,
wherein the method further comprises:
determining that the selected color scheme satisfies an accessibility requirement;
based on the determination:
generating a visual notification that the color scheme satisfies the accessibility requirement;
initiating the display of the visual notification.

* * * * *